United States Patent [19]

Donovan et al.

[11] Patent Number: 4,842,450

[45] Date of Patent: Jun. 27, 1989

[54] METHOD AND APPARATUS FOR SELF-ADJUSTING BORING BAR

[75] Inventors: David A. Donovan, Chelsea; Nathaniel L. Field, Northville, both of Mich.

[73] Assignee: Ford Motor Company, Dearborn, Mich.

[21] Appl. No.: 253,467

[22] Filed: Oct. 5, 1988

[51] Int. Cl.$^4$ .................. B23B 41/12; B23B 35/00
[52] U.S. Cl. ..................... 408/1 R; 408/13; 408/56; 408/59; 408/83; 408/705; 408/708
[58] Field of Search ............. 408/80, 81, 83, 158, 408/159, 705, 708, 709, 1 R, 13, 56, 57, 59, 707, 79

[56] References Cited

U.S. PATENT DOCUMENTS

| | | | |
|---|---|---|---|
| 3,217,568 | 11/1965 | DeGraffenried | 408/13 |
| 3,438,287 | 4/1969 | Kampmeier et al. | 408/79 |
| 3,438,288 | 4/1969 | Kaiser | 408/79 |
| 3,492,894 | 2/1970 | Hahn et al. | 408/13 |
| 4,269,421 | 5/1981 | Wawrzyniak | 279/16 |
| 4,451,185 | 5/1984 | Yamakage | 408/2 |
| 4,693,642 | 9/1987 | Mair et al. | 408/83 X |
| 4,701,081 | 10/1987 | Hashimoto et al. | 408/708 X |

FOREIGN PATENT DOCUMENTS 598706 3/1978 U.S.S.R. ............... 408/705

*Primary Examiner*—Steven C. Bishop
*Attorney, Agent, or Firm*—Joseph W. Malleck; Roger L. May

[57] ABSTRACT

Method and apparatus for conducting boring of a series of spaced walls on a workpiece using a self-adjusting boring bar. The method comprises: (a) supporting a spindle in a rotationally fixed tubular housing to provide an assembly having an unsupported extremity adapted to extend throughout the series of walls, the support providing for independent rotary movement but conjoint axial movement of the spindle within such tubular housing, such spindle carrying a cutting tool to project beyond the tubular housing; (b) providing an angularly flexible joint in each of said spindle, such as complementary curvilinear splines on two mated ends of different portions of said spindles, and tubular housing, such as separate tubular housing sections coupled by a web; (c) advancing the cutting tool successively through the series of walls to machine the aligned openings and thereby causing the spindle and tubular housing to follow successively through such machined openings, said spindle and housing providing, during advancement to machine the second and successive walls of the series, (i) concentric macroalignment of the spindle within the tubular housing and macroalignment of the tubular housing within the walls of the openings, and (ii) a sense of microalignment of the housing within at least the previously machined; and (d) in response to a sensed micromisalignment of said spindle head, selectively imparting a microangular steering force to the tubular housing and thereby to the spindle to achieve the desired microalignment. The apparatus employs a split tubular housing with piezoelectric means for imparting microscale angular adjustments.

17 Claims, 4 Drawing Sheets

FIG.1

Support a spindle in a rotationally fixed tubular housing to provide an assembly having an unsupported extremity adapted to extend throughout a series of spaced walls, the support providing the spindle with independent rotary movement but conjoint axial movement within the tubular housing, the spindle carrying a rotary cutting tool to project beyond the tubular housing;

provide an angularly flexible joint in each of the spindle and tubular housing effective to cooperate with the other;

advance the cutting tool successively through the series of walls and thereby cause the spindle and tubular housing to follow successively through such openings, the spindle and housing providing, during advancement to machine the second and successive walls of the series, (i) concentric macroalignment of the spindle within the tubular housing and macroalignment of the tubular housing within the walls of the openings traversed by the cutting tool, and (ii) a sense of the macroalignment of the housing within at least the previously machined opening; and selectively impart an angular steering force to the tubular housing in response to any micromisalignment of the spindle head and thereby a steering force to the spindle to achieve the desired microalignment.

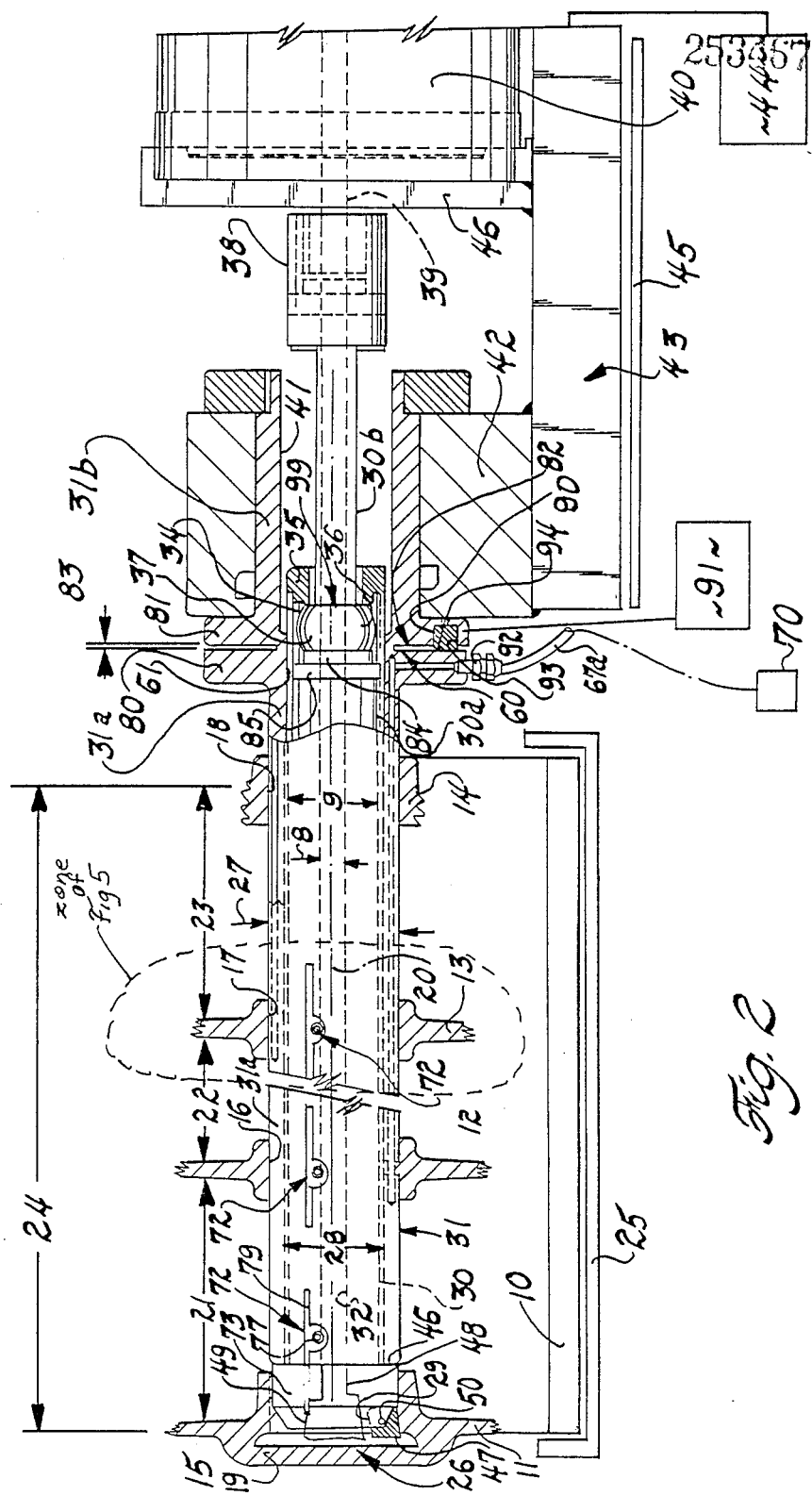

METHOD AND APPARATUS FOR SELF-ADJUSTING BORING BAR

BACKGROUND OF THE INVENTION

1. Technical Field

This invention relates to the art of boring metal workpieces and more particularly to boring blind openings in multiple walls of a workpiece spaced over a lineal length of at least 12 inches.

2. Discussion of the Prior Art

Accurate placement of a boring bar, and thereby its cutting tool, is a serious problem when boring blind aligned openings in several walls of a workpiece with a single boring bar, particularly when the outside walls of such series are spaced apart a distance of at least about 12 inches (30.5 cm). In this situation, the boring bar must, by the nature of blind bores (bores which do not extend through the entire workpiece or have access from opposite directions), have an unusually long unsupported portion to permit machining from one access direction.

How can one be assured the cutting tool is accurately boring the spaced openings in true alignment throughout the distance the openings are spaced apart? One approach of the prior art is to support a spindle for the boring bar with a floating tool holder (see U.S. Pat. No. 4,269,421) which permits radial and angular movements of the spindle as it is steered mechanically by the opening being machined; this will not obtain steering of the spindle independent of the individual opening and thus may lead to nonalignment of the openings when boring separate openings in spaced walls. Another approach is to interrupt the boring operation frequently to use contact gauges (see U.S. Pat. No. 4,451,185) and thus make incremental adjustments during such interruptions; but this technique is laborious and cannot be carried out in real time (real time is that which takes place during the boring activity), and does not necessarily assure precise alignment of all borings.

Still another attempt has been made to steer the unsupported portion of a boring bar by deploying a stack of piezoelectric elements (see U.S. Pat. No. 3,492,894). Undesirably, the manner of locating and arranging such elements requires that the elements be numerous and stacked to exert a force over a long distance to effect adjustment. Such movements are on a macroscale (macrosteering or macroscale is defined herein to be that which involves movements of .01 inches or greater) and thus unable to achieve precise alignment. The disclosed type of steering in the latter patent is also deficient in that an external gage is used to sense the position of the spindle independent of the openings being machined, thereby allowing for error; such error may be compounded if the boring apparatus is set wrong with respect to the workpiece, irrespective of the accuracy of the external gauge.

It would be desirable if gauging could sense the dimensional tolerances that exist between a reference surface of the cutting tool support and the walls of the openings by solely internal microscale means and thereby provide a truer guide for real time steering adjustments. More importantly, there is a need for a method and apparatus that steers the boring bar, independent of mechanical steering by the openings, in microscale adjustments during boring and in response to signals from such microscale internal gauging.

SUMMARY OF THE INVENTION

A primary object of this invention is to provide a method and apparatus to more accurately bore blind multiple openings along a common axis in a series of spaced walls. Such boring should be capable of being carried out at high boring bar rotational speeds of 400–900 rpm or higher and at high insertion rates of 400–800 inches/minute.

A more specific object is to sense the dimensional tolerances that exist between a reference surface of the support for the cutting tool and a wall of the openings by solely internal microscale means and to respond to such sensed signals by use of a microscale steering mechanism.

Another object is to shorten the process time of carrying out machining operations through multiple walls by eliminating specialized set-up procedures for different types of workpieces and eliminating special machining requirements unique to a specific workpiece design.

The invention herein accomplishes such objects firstly by a method which comprises: (a) supporting a spindle in a rotationally fixed tubular housing to provide an assembly having an unsupported extremity adapted to extend throughout the series of walls, the support providing for independent rotary movement but conjoint axial movement of the spindle within such tubular housing, such spindle carrying a rotary cutting tool to project beyond the housing; (b) providing an angularly flexible joint in each of said spindle and tubular housing; (c) advancing the cutting tool successively through the series of walls to machine the aligned openings and thereby causing the spindle and tubular housing to follow successively through such openings, the spindle and housing providing, during advancement to machine the second and successive walls of the series, (i) concentric macroalignment of the spindle within the tubular housing and macroalignment of the tubular housing within the walls of the openings, and (ii) a sense of microalignment of the housing within at least the previously machined opening; and (d) in response to a sensed micromisalignment of said spindle head, selectively imparting a microangular steering force to the tubular housing and thereby to the spindle to achieve the desired microalignment.

Preferably, the angularly flexible joint in the spindle comprises complementary curvilinear splines on two mated ends of different portions of said spindle.

Preferably, the angularly flexible joint in the tubular housing comprises separate tubular housing sections coupled by a web; opposite-facing flanged lever members are provided at either side of such web, the web being sufficient to transfer holding forces for maintaining a fixed rotary position of both sections but facilitating angular adjustment between said sections.

Preferably, the macroalignment of the spindle within the tubular housing and the tubular housing within the wall openings, is provided by a means directing hydrostatic fluid pressure through the tubular housing to axial locations therealong; such locations corrolate with the spacing between the walls providing for the application of forces against the opening walls to concentrically align the housing and spindle. Such hydrostatic fluid pressure is preferably carried to radially directed orifices extending to the inner and outer surfaces of the tubular housing at each of such axial locations for discharging hydrostatic fluid pressure and thereby provide an adjustable fluid bearing film which exerts equal and opposite hydrostatic forces on the spindle in one instance and on the cavity walls in the other instance.

BRIEF DESCRIPTION OF THE DRAWINGS

FIG. 1 is a schematic flow diagram of the method steps of this invention;

FIG. 2 is a partially sectional and partially schematic view of an apparatus embodying the apparatus aspect of this invention and is useful in carrying out the method herein; the spindle and tubular housing are shown as having been fully inserted for horizontal machining throughout a series of bulkhead walls;

DETAILED DESCRIPTION AND BEST MODE

Figure 3:
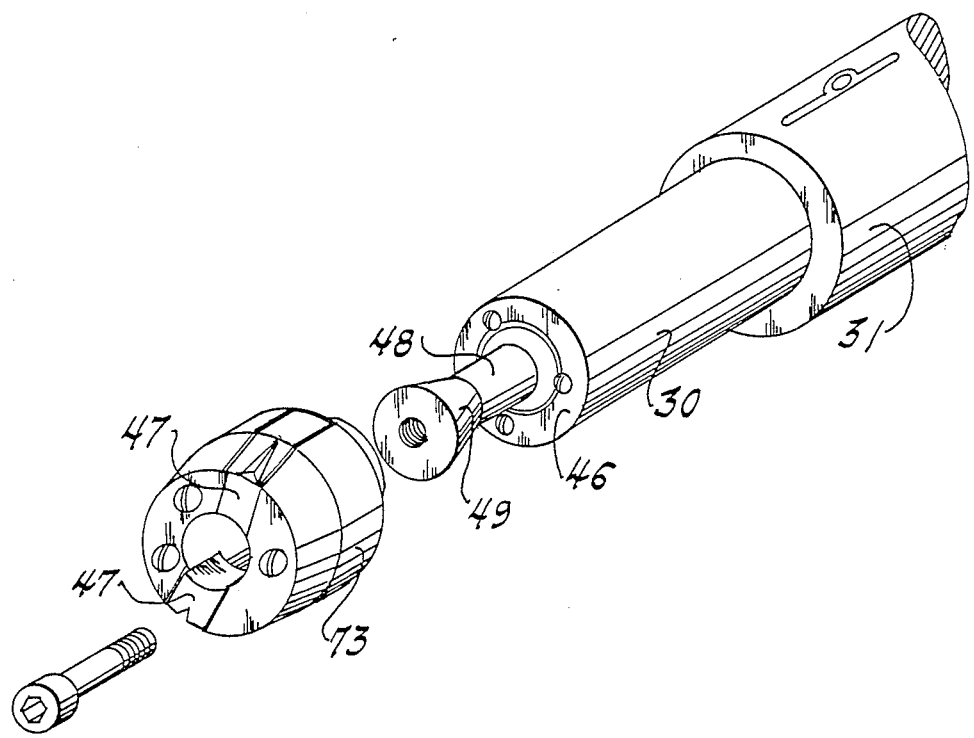
FIG. 3 is an exploded perspective view of the unsupported end of the spindle and tubular housing.

FIG. 1 illustrates an elementary flow diagram for the steps of the method aspect of this invention. The method comprehends boring blind multiple aligned openings in a series of spaced walls of a workpiece, comprising the steps of: (a) supporting a spindle in a rotationally fixed tubular housing to provide an assembly having an unsupported extremity adapted to extend throughout a series of spaced walls, the support providing the spindle with independent rotary movement but conjoint axial movement within the tubular housing, the spindle carrying a rotary cutting tool to project beyond the tubular housing; (b) providing an angularly flexible joint in each of said spindle and tubular housing effective to cooperate with each other; (c) advancing the cutting tool successively through the series of walls and thereby cause the spindle and tubular housing assembly to follow successively through such aligned openings the spindle and housing providing, during advancement to machine the second and successive walls of the series (i) concentric macroalignment of the spindle within the tubular housing and macroalignment of the tubular housing within the walls of the openings, and (ii) a sense of the microalignment of the end of the housing within at least the previously machined opening; and (d) selectively imparting a microangular steering force to the tubular housing in response to any micromisalignment of the spindle head and thereby a steering force to the spindle to achieve the desired microalignment.

Macroalignment is defined herein to mean bringing several points, regions or surfaces substantially into straight line agreement while permitting deviations from such agreement within the range of 0.02–0.09 inches. Microalignment is defined herein to mean bringing several points, regions or surfaces substantially into straight line agreement with any deviation from such agreement not exceeding 0.01 inches.

The use of a tubular housing, extending substantially coextensively with the spindle, provides a mechanism by which the wall openings, through which the spindle must extend to effect machining, can serve as surfaces for fluid bearings to support the assembly at intermediate locations rather than merely at the end through a cantilevered support. Thus, if flexibility is built into the spindle and housing for angular adjustment, microadjustments can be made to the spindle in response to microgauging of the end of the spindle. Without such intermediate support, the ability to carry out microsteering and microgauging would not be feasible.

Workpiece

As shown in FIG. 2, the workpiece 10 of interest to the method and apparatus of this invention is one which has a series of spaced walls 11, 12, 13, and 14 which may be laterally extending walls of a cast housing for an engine valvetrain compartment, or may be the laterally extending bulkhead walls of an integral crankcase housing for an engine crankshaft. Each wall has an opening defined by a cylindrical wall to act as a bearing support. The several bearing supports secure a camshaft in place for operation, in the case of a head casting, or secure a crankshaft in place for operation, in the case of a crankcase housing. Wall 11 is formed such that the opening 15 does not extend all the way therethrough due to the presence of the end member 19. Thus, the series of openings 15, 16, 17 and 18 are considered blind openings in the sense that a spindle extending therethrough cannot be reached from both sides and therefore cannot be supported from two ends of the spindle axis 20. The walls are spaced apart distances identified as 21, 22 and 23 respectively as shown in FIG. 2, and extend over a total distance 24 which is greater than a minimum of about 12 inches to present the problem particularly solved by this invention. For purposes of identification in the description of the method aspects of this invention, the first opening encountered by the cutting tool 47 carried by the spindle 30 is considered a lead opening; the lead opening, of course, successively changes as the spindle progresses through the series of walls. The other openings (other than the lead opening) will have the walls thereof receiving the spindle 30 and tubular housing 31 as shown in FIG. 2; the lead opening will receive the spindle head 73 before entrance of the tubular housing 31 thereinto.

A fixture 25 may be employed to hold the workpiece in place during the method sequence of machining. Such fixture may also be used to carry the workpiece into the cutting tool to achieve the insertion or advancement of an assembly of the spindle and tubular housing into the several walls of the workpiece. Workpieces of interest to this invention are those that are comprised of metal and can be machined at high rotational speeds such as 400–900 rpm or higher and advancement rates of 400–800 inches/minute.

Support

As shown in FIGS. 2 and 3, the spindle 30 carries one or more cutting tools 47 is supported for rotary movement by way of a tubular housing 31. The tubular housing 31 moves conjointly with the spindle 30 for axial movement, but is fixed against rotation. The support for the tubular housing is first by a main support structure or C-brace 43 at one end of the housing, and secondarily at one or more spaced locations provided by the walls of aligned openings (15, 16, 17, 18) of the workpiece 10. The spindle and tubular housing together form an assembly which is inserted through the series of aligned openings in the bulkhead walls of the workpiece, with the tubular housing being held against rotation while permitting the spindle to rotate at exceptionally high speeds. The spindle is supported in the tubular housing by way of an adjustable fluid bearing, which will be described subsequently; the tubular housing is supported in the aligned openings of the bulkhead walls of the workpiece also by fluid bearings as will be subsequently described.

The spindle 30 has a head 73 which extends beyond the end 46 of the tubular housing so that the cutting tool 47, carried by such head, will have access to the walls of the openings for machining. The spindle has a hollow interior with a diameter 8 and an outside diameter 9. The outersurface of the spindle is spaced slightly from the internal diameter 28 of the tubular housing. The tubular housing has an external diameter 27 which is slightly spaced from the bulkhead wall openings by virtue of fluid bearings.

The main support structure for one end of the tubular housing is comprised of a C-brace 43 having one leg 42 which envelopes the end of the tubular housing and holds it secure against rotary motion. The other leg 46 of the C-brace 43 carries the rotary drive or motor 40 for the spindle. The output shaft 39 of the motor 40 is coupled for rotary driving of the spindle by an internally splined coupling 38. The C-brace is actuated along a rail 45 by an actuator 44 to promote selected axial movement of the tubular housing and thereby, in turn, the spindle 30 which is conjointly carried therewith.

The cutting tool 47 may be of conventional configuration formed as a rhombus which is pivotally connected at 50 to the head 73; the radial orientation of the cutting tool to the opening can be changed by means 26. Such means 26 comprises a rod 48 carried within the cylindrical cavity 32 of the spindle, which rod extends into the spindle head and carries a cam with a camming surface 49 at such extremity. By axial movement of the rod within the spindle, the camming surface can be brought to bear against complementary surface 29 on the rotary cutting tool for adjusting the orientation of the cutting edge and thereby changing its radial position.

Flexible Joints

A flexible joint 60 is provided in the tubular housing 31 by separating such housing into section 31a and 31b connected by integral web 61 effective to permit angular adjustments between the sections while promoting conjoint axial movement therebetween. Flanged lever members 80 and 81 extend in adjacency from opposite axial sides of the web as shown in FIG. 2. The flanged lever members are closely spaced together and separated by a distance 83 which may be in the range of 0.05–0.1 inch. The space between such flange lever members is carried radially deep into the tubular housing so as to leave only the thin section 61 preferably in the thickness range of 0.1–0.25 inch.

An angularly flexible joint 99 is provided in the spindle 30 by separating the spindle into members 30a and 30b. Member 30a is a tubular member having an external diameter 9 and an internal diameter 8. The end of such member 30a, which rests radially beneath the flange lever members 80 and 81, is provided with internal splines 34 annularly arranged around the interior of such section. The flexible joint 90 further comprises the provision of a spherical member 37 on the end of member 30b which dovetails or fits within the interior of the end of member 30a. Curvilinear splines 36 are formed on the exterior of such spherical member 37 to interfit and mate with the splines 34 of member 30a. The spherical member 37 is positioned in a locked relationship to such splines by a member 84 abutting a complementary member 85 carried by the tubular member 30a, and the other side of the spherical member is locked by a member 35 which fits within the grooves 34 of the member 30a.

Macroalignment

Figure 5:
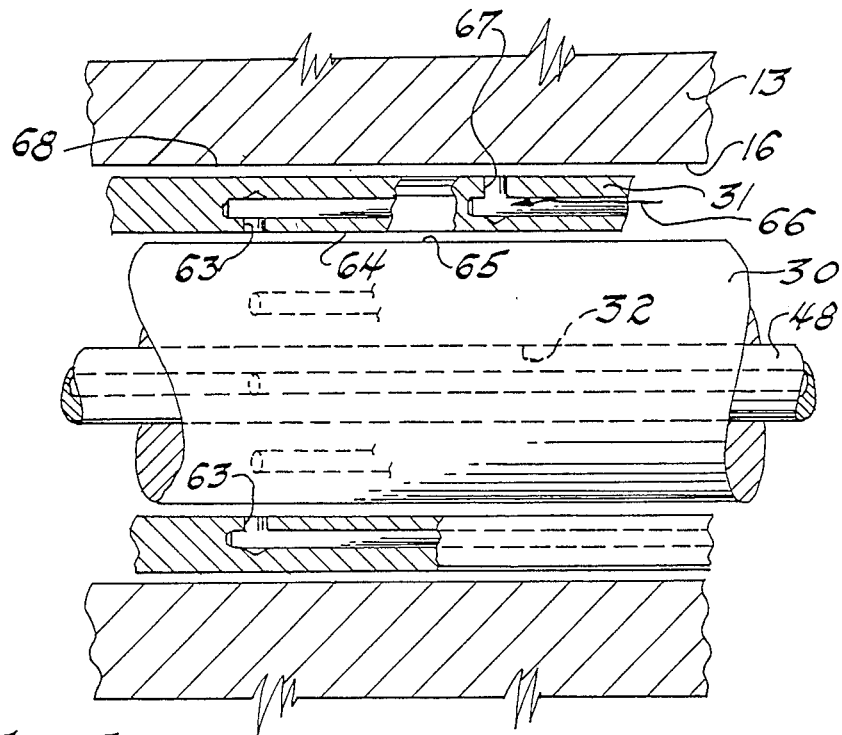
FIG. 5 is also an enlarged partially sectional view of a zone circled in FIG. 2.

Concentric macroalignment of the spindle 30 within the tubular housing 31, as well as the macroalignment of the tubular housing 31 within the walls of the aligned openings (such as wall 13) is provided by opposed radial orifices 63 and 67 at predetermined spaced locations along the axial extent of the tubular housing (see FIG. 5). The radially inwardly directed orifices 63 may be placed at spaced locations sufficient to provide a fluid film between the inner surface 64 of the tubular housing and the outer surface 65 of the spindle 30. However, the axial spacing of the radially outwardly directed orifices 67 should coincide with the spacing between the lateral bulkheads of the workpiece to machined. The orifices communicate with a hydrostatic fluid pressure supply 66 which is provided by passages that extend through the interior of the tubular housing 31 and connect with an external fluid pressure supply such as by way of a passage extending radially outwardly through flanged lever member 80 and to connect by way of a flexible connection 67a to a pressure supply 70 (see FIG. 2).

The adjustable fluidic bearings utilize the frontal positioning of a cylindrical wall opposite the orifice to restrict hydrostatic fluid flow through the orifices. In the case of a fluidic bearing between the tubular housing and spindle, the hydrostatic fluid exiting from the orifice 63 is restricted by the frontal positioning of cylindrical wall 65 of the spindle. If the space between the orifice and the frontal wall is closed or restricted, the back pressure of the hydrostatic fluid flow is increased due to such restriction and thereby increases. The fluid pressure communicated to the other opposed orifice 63 at the opposite side of the spindle drops in pressure due to a corresponding increase in the spacing with wall 65. This unbalance of pressure urges the spindle to assume a more concentric position on a macroscale.

Similarly, a fluidic film or adjustable bearing is maintained between the outer surface of the tubular housing 68 and an inner surface 16 of a bulkhead wall. The orifice 67 ejects fluid therefrom which encounters the frontal positioning of wall 16 and if the tubular housing is closer to one side of such wall, the increase in fluid pressure is accompanied by a decrease in pressure at the opposite orifice 67, again encouraging macroscale concentricity to balance the forces within the bulkhead opening. There exists a definite relationship between (i) the clearance between the orifice and the restricting wall and (ii) the back pressure.

Hydrostatic fluid pressure may also be communicated to an orifice (not shown) between shoulder 86 of head 73 and the end 46 of the tubular housing to maintain an adjustable fluid bearing on a radial plane. Fluid can exit in an axial direction from such orifice and is directed against the annular shoulder 86 to provide a fluid film between the rotating spindle head 73 and the rotationally fixed tubular housing.

Microgauging

Figure 4:
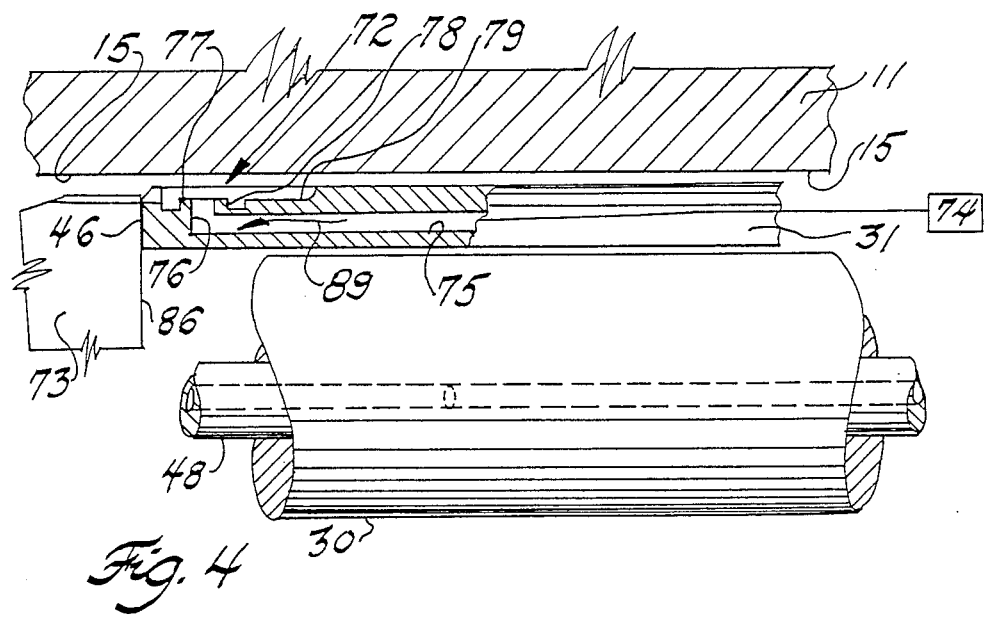
FIG. 4 is an enlarged sectional view of a portion of the spindle head and adjacent tubular housing.

Sensing microalignment of the spindle within the lead opening (the opening undergoing machining, such as opening surface 15 in FIG. 4), is provided by use of a gauging means 72. Gauging means 72 senses, on a microscale, the radial position of the unsupported end of the spindle. Radially outwardly directed orifices or nozzles 76 are disposed on opposite sides of the spindle to form a pair; several of such pairs may be utilized as long as they are circumferentially spaced apart commensurate with the spacing between the walls of the series. The orifices are used to direct pairs of flows 89 of hydrostatic fluid against the wall 15, such as of the lead opening; the flows of each pair are at diametrically opposite sides of the spindle head and are commonly supplied with a hydrostatic fluid pressure in the range of 15-25 psi, carried by way of axially extending passages 75 communicating with a fluid pressure source. The pressure supplied to an individual nozzle 76 can be sensed by either a straight or differential pressure transducer 74 to determine the degree of back pressure. If the spindle is moved nonconcentrically to one side or the other within the lead bore opening, the fluid pressure of one orifice of such pair will be increased due to the closing of the spacing between the end of such nozzle 76 and the surface 15 thereby restricting flow of fluid therefrom. The degree of increase of pressure is an indicator of micromisalignment.

Each of the orifices may be provided with an annular land 77 defined by annular grooves 78 therearound, the land being recessed below the outward surface of the tubular housing. This facilitates a predetermined flow of fluid for the gauging nozzle and prevents a total closing off of the nozzle. The annular space 78 may be intersected by longitudinally extending groove 79; such grooves enhance the resistance to sticking of the nozzle against the opposing side of the opening.

Microsteering

The steering force to precisely control cutting accuracy is imparted by the use of flanged lever members 80 and 81 which extend in adjacency from opposite sides of web 61. A piezoelectric electric unit or assembly 90 is deployed between the flanged lever members 80 and 81 and is responsive to an electrical current passed therethrough for swelling or shrinking the crystals of such unit to increase or decrease the angular relationship of the flanged lever members and thereby impart a microscale change to the angularity of the tubular housing sections. The piezoelectric unit or assembly receives its electrical current from a supply 91. Such crystal units can typically create a dimensional change of plus or minus 0.02 inches.

The elements of the piezoelectric unit may be comprised of lead zirconate/titinate commonly known as PZT. These crystals are sensitive to actuating voltages in the range of 0-150 volts for full expansion. The piezoelectric crystal units are positioned so that most of its sides are nested within a secure receptacle 93 of member 81 and side 92 of the crystal unit is free to bear against the opposing surface 94 of the flange lever member 80. If the crystal unit expands, the levers 80 and 81 are spread apart at one side of their radial extremities causing a tilting or angular adjustment of tubular housing section 31a with respect to the fixed section 31b. This invention allows closer radial positioning of the crystal to the axis of the spindle and thereby makes it more sensitive to effect microscale adjustments. Thus, microscale changes in the spacing 83 between the flanged levers may be effected by passing an electrical current through the piezoelectric unit and this translates into microscale angular adjustments of the tubular housing. The outer surface 92 of the piezoelectrical unit can be moved in a range of 0.02 inches by use of voltages up to 150 depending on the arrangement of the crystals and the particular frequency response and hysteresis. Particular details of a control circuit for such a piezoelectric electromechanical translation apparatus is more particularly described in U.S Pat. Nos. 3,902,084 and 3,902,085, the disclosures of which are incorporated herein by reference.

One of the great advantages of the method and apparatus of this invention is the ability to more accurately bore blind multiple openings in a series of spaced walls along a horizontal common axis such as is encountered in machining a housing which normally supports the camshaft of an engine assembly. The ability to bore such accurate openings over such a long horizontal extent, at least 12 inches, enables the camshaft housing designer to eliminate cap screws normally required to split the bearing support. This leads to a savings not only in machining costs but also reduces the time of machining the entire workpiece.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed:

1. A method of boring blind multiple aligned openings in a series of spaced walls of a workpiece, comprising the steps of:
   (a) supporting a spindle in a rotationally fixed tubular housing to provide an assembly having an unsupported extremity adapted to extend throughout said series of walls, said support providing said spindle with independent rotary movement but conjoint axial movement within said tubular housing, said spindle carrying a rotary cutting tool to project beyond the tubular housing;
   (b) providing an angularly flexible joint in each of said spindle and tubular housing effective to cooperate with each other;
   (c) advancing said cutting tool successively through said series of walls to machine said aligned openings and thereby causing said spindle and tubular housing to follow successively through said machined openings, said spindle and housing providing, during advancement to machine the second and successive walls of said series, (i) concentric macroalignment of the spindle within said tubular housing and macroalignment of the tubular housing within the walls of openings traversed by said cutting tool, and (ii) a sense of microalignment of the housing within at least the previously machined opening; and
   (d) selectively imparting an angular steering force to the tubular housing in response to any micromisalignment of the spindle in such opening undergoing machining, and thereby a steering force to said spindle to achieve the desired microalignment.

2. The method as in claim 1, in which said angularly flexible joint for at least said housing is provided by separating said tubular housing into sections connected by an integral web effective to permit angular adjustments between said sections while promoting a conjoint axial movement therebetween.

3. The method as in claim 2, in which said steering force is imparted by the use of flanged lever members extending in adjacency from opposite sides of said web and by the deployment of a piezoelectric crystal unit between said flanged levers responsive to an electrical current passed therethrough for increasing or decreasing the angular relation of said flanged levers and thereby impart a change to the angularity of said tubular housing sections.

4. The method as in claim 1, in which the speed of advancement for step (c) is in the range of 400–800 inches/minute, and the speed at which the spindle is driven is in the range of 400–900 rpm.

5. The method as in claim 1, in which said series of walls extend over a length of at least 12 inches and the separation between said walls is generally uniform.

6. The method as in claim 1, in which the angularly flexible joint for said spindle is provided by separating said spindle into two members, one member being articulated to the other by the use of mating curvilinear splines on each of said members for promoting a rotary driving connection therebetween but facilitating angular adjustment.

7. The method as in claim 1, in which the step of providing concentric macroalignment of the spindle within said tubular housing is effectuated by the use of radially directed orifices extending through the tubular housing to at least the radially inner surface of the housing for discharging hydrostatic pressure of fluid supplied thereto to provide an adjustable fluid bearing film between said spindle and tubular housing.

8. The method as in claim 1, in which said macroalignment of said tubular housing within the walls of openings traversed by said cutting tool is effectuated by the use of radially directed orifices (i) extending through said housing to at least the radially outer surface of the housing for discharging hydrostatic pressure of fluid supplied to said orifices, and (ii) spaced longitudinally along said housing commensurate with tie spacing between said walls, said orifices providing an adjustable fluid bearing between said housing and walls of such openings.

9. The method as in claim 1, in which the step of sensing microalignment is effectuated by the use of hydrostatic fluid gauging nozzles located at least at the leading end of said tubular housing, any variation in the back pressure of fluid passing through said nozzles, when said nozzle is adjacent a machined wall opening, being indicative of a change in dimensional relationship between said housing and wall opening.

10. The method as in claim 9, in which said nozzles are spaced along the tubular housing at locations commensurate with the space between said workpiece.

11. The method as in claim 9, in which the desired microalignment is obtained within the tolerance range of plus or minus 0.02 inches.

12. Boring apparatus for workpieces having a series of spaced walls, each with an aligned opening to be bored on a common workpiece axis, comprising:
(a) a rotary driven, articulated spindle adapted to advance along said common workpiece axis and having a cutting tool carried on an unsupported end thereof for being passed substantially along the wall of said opening to effect boring;
(b) means for sensing the microscale radial position of said unsupported end within the lead opening of said series of walls;
(c) an articulated tubular housing support journaling said spindle within the trailing openings of said series of walls;
(d) means for hydrostatically aligning said spindle within said tubular housing; and
(e) means for imparting a microscale angular steering force to said tubular housing to effect a microscale adjustment thereof.

13. The apparatus as in claim 12, in which said means for sensing the microscale radial position of the unsupported end comprises (i) nozzles in said housing effective to direct pairs of flows of fluid against the walls of said lead bore, said flows of each pair being on diametrical sides of said spindle, (ii) a fluid supply to said orifices, and (iii) pressure sensors for each of said flows to determine any differential in hydrostatic pressure for each pair of flows.

14. The apparatus as in claim 12, in which said means for imparting a microscale steering force comprises piezoelectric elements effective to impart a force at a position no greater than two times the radius of said tubular housing from said spindle axis.

15. An apparatus for boring blind multiple openings in each of a series of spaced walls along a common axis, characterized by the combination of:
(a) a rotary driven spindle of sufficient length to extend substantially through said series of walls, said spindle carrying a radially adjustable cutting tool at its unsupported extremity;
(b) a tubular housing support journaling said spindle, said tubular housing being axially moveable for conjoint axial movement with the said spindle and fixed against rotational movement;
(c) macroscale means for concentrically journaling said spindle within said tubular housing and for concentrically aligning the tubular housing within said wall openings;
(d) means for sensing any micromisalignment of said spindle extremity within at least the lead bore; and
(e) means for imparting a microscale angular steering force to said tubular housing to effect microscale adjustment thereof and achieve a desired angular alignment.

16. The apparatus as in claim 15, in which said means for imparting a microscale angular steering force comprises an integral web interposed between separated sections of said tubular housing, said integral web providing for angular adjustment between said sections while providing for conjoint axial movement therebetween, said sections having radially extending flanged levers disposed in adjacency at opposite sides of said web; and a piezoelectric crystal assembly placed between said flanged levers whereby, in response to the passage of electrical current therethrough, the crystal assembly will increase or decrease in size and thereby control the spacing between said flanged levers and thus the angular relationship of said sections.

17. The apparatus as in claim 15, in which said macroscale journaling means comprises passages in said tubular housing for supplying hydrostatic fluid pressure therealong, and radially opposed orifices extending through the tubular housing to each of the inner and outer surfaces of the tubular housing for discharging hydrostatic fluid pressure provide a fluid film between said spindle and tubular housing and between the tubular housing and cavity walls.

* * * * *